May 27, 1930.  A. HERZ  1,760,646
METER
Filed Aug. 19, 1925  2 Sheets-Sheet 1

Witnesses:
William R. Kilroy
Harry R. Levhull

Inventor:
Alfred Herz
By
Attys

May 27, 1930.   A. HERZ   1,760,646
METER
Filed Aug. 19, 1925   2 Sheets-Sheet 2
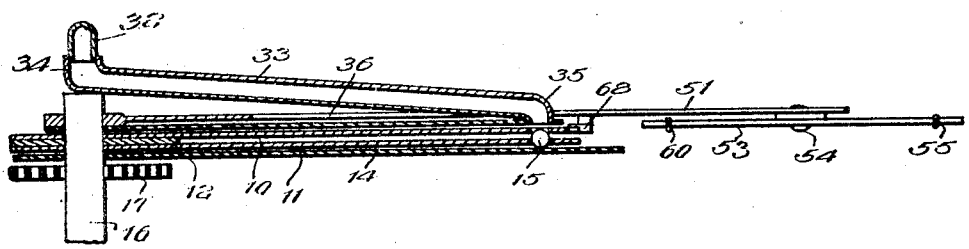
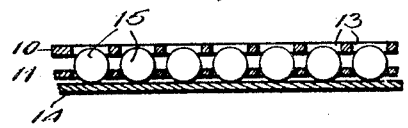
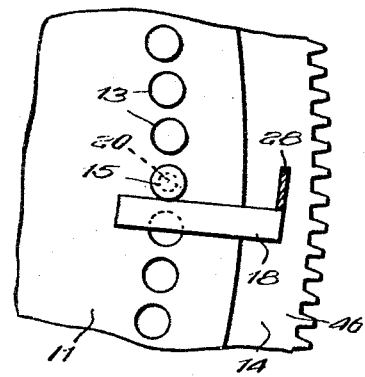
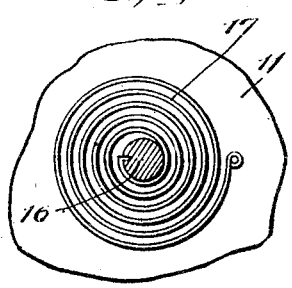
Inventor:
Alfred Herz Patented May 27, 1930

1,760,646

UNITED STATES PATENT OFFICE

ALFRED HERZ, OF CHICAGO, ILLINOIS

METER

Application filed August 19, 1925. Serial No. 51,238.

My invention relates to meters and more particularly to meters for measuring the rate at which an action under consideration occurs. The meter of the present invention is applicable to measuring demand for electric power, gas, steam, or the like.

The theory of measurement of rate upon which the operation of the present meter proceeds is different from the usual rate meter and it results in a simple and inexpensive meter which can be made as accurate as may be desired.

The customer who buys electric current, gas, or the like, really buys work and he expects to pay for such work upon a uniform unit basis as, for example, ten cents per kilowatt hour. This uniform rate of payment is not equitable as it does not take into account the rate at which work is done, that is, the rate at which current is drawn. Hence the practice has grown up of charging more for power drawn at a rate in excess of a predetermined maximum rate. As a practical example, a penalty is assessed for drawing current at a rate in excess of a predetermined maximum if such excessive drawing continues over a half hour or more.

In meters of the prior art there have been two general methods of ascertaining demand over a thirty minute period, first by integration of the load for successive half hour periods and, second by integration of the load for half hour periods from minute to minute. This latter method of minute to minute measurement of demand is preferable. My copending application, Serial No. 44,679, filed July 20, 1925, discloses a meter for measuring demand in accordance with the second above named method. In that application I provided a movable member advancing at a uniform rate of movement per unit of time and for each unit of movement corresponding to a unit of time I assign tokens which in weight, count, or the like correspond to demand for that unit of time. Then at successive minutes by weight, count, or the like of the total number of tokens for thirty successive units of time I indicate the previous thirty minute total at any given minute.

Now according to the present invention I provide a movable member which is advanced a variable distance corresponding to the variable amount of demand for the unit of time, that is, a minute. I demark the variable movement for a given minute by tokens which are permitted to remain in place for thirty minutes and are successively removed as they reach the thirty minute limit. The advance attained by such token at the completion of its life of thirty minutes is a measure of the demand for the period of the previous thirty minutes.

As a practical embodiment I provide a movable disc having holes or notches therein corresponding to unit quantities of the variable, that is, demand. These notches are arranged about the periphery in a circular row. The disc is advanced a number of notches per minute corresponding to the demand for that minute. Then, upon completion of the minute, a marker such as a pin, ball, or the like, is dropped into the notch or hole and marks the variable advance for that minute. So for successive minutes the variable angular movements are pegged off. At the end of thirty one minutes the foremost peg or ball is removed and so successively for successive minutes the successive markers are erased or removed when they have been in place for thirty minutes.

For practical reasons I use steel balls dropped into pockets to mark off the successive minutes, and I use a feeler or stop finger carried forward by the forward ball to indicate the total movement corresponding to demand for the past thirty minutes.

When a ball has been in place for thirty minutes it is punched out of its pocket and sent back to the foot of the line, for I find that in measuring a thirty minute demand it is advisable to use only thirty balls. Hence, when a ball has been in place on the movable disc for thirty minutes, whether any demand has occurred or not, it is punched out of place and sent back to the foot of the line. Thus, I use one operation, namely, transfer of a ball from the head of the line to the foot of the line as marking off the thirty-first minute and marking on the first minute of the series under contemplation.

For practical reasons I provide means for keeping the balls in transfer during the time of no load, and to permit this action I provide for advancing the movable disc by one notch each time a ball is punched out of place and permitted to drop back into a fresh place. In other words, during periods of idleness as to demand, the balls are merely juggled from the thirtieth or thirty first position to zero or first position and as soon as there is any demand the circuit through which the move is extended by variable angular amounts.

Now in order to acquaint those skilled in the art with the method of construction and operation of a device embodying my invention, I shall describe in conjunction with the accompanying drawings a specific embodiment of the same.

In the drawings:

Fig. 3 is an enlarged sectional view taken on the line 3—3 of Fig. 1;

Fig. 4 is a fragmentary section through the pockets on the disc;

Fig. 5 is an enlarged horizontal section taken on the line 5—5 of Fig. 2; and

Fig. 6 is a fragmentary cross section taken on the line 6—6 of Fig. 2.

Figure 1:
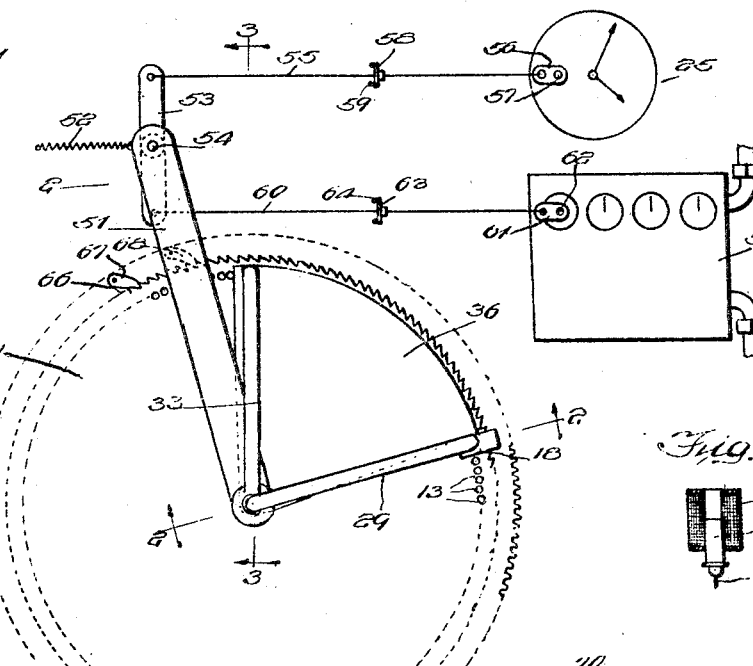
Figure 1 is a plan view of a demand meter of my invention showing the same connected to a clock and to a meter which may be a gas or electric meter for operation thereby.

Referring now to the drawings, the meter therein disclosed comprises essentially a rotary carriage or plate 1, which in actual construction is a compound structure, the carrier advance means 2, and a combined marker applying and removing device 3, and a responsive indicating device 4.

The rotary carrier as shown comprises a pair of plates 10 and 11 slightly spaced apart as by means of a spacing plate 12 at the center. These plates 10 and 11 have registering perforations 13 adjacent their outer periphery for the reception of markers, in this case steel balls 15. The markers are kept from dropping through the holes by a bottom plate 14 which is stationary with the main stem or column 16 which comprises the frame of the device. The plate 14 completely underlies the plates 10 and 11 so as to keep the markers in the pockets or holes 13 from dropping therethrough completely around the periphery of the rotary carrier 1. This plate 14 is movable rotarily about the post or standard 16, but it is always urged in a counterclockwise direction, as viewed in Fig. 1, by means of the clock spring 17 which is connected between said plate 14 and the post or column 16.

It is not strictly essential that the plate 14 cover the pockets 13, since the lower plate 11 may be constructed with an opening smaller than the size of the marker, so that the markers will not drop through the bottom plate but will rest in pockets formed by the two plates. However, the essential function of the plate 14 is to support the feeling or finding finger 18 and the co-operating parts of the marker applying and removing device 3.

The plate 14 bears a sleeve 19 in which there is guided a rod or pin 20, this rod or pin being connected as by means of the arm 21 to the core 22 of solenoid 23. The circuit of solenoid 23 is adapted to be closed periodically, as by the circuit closer 24, which may be a part of the clock mechanism 25 hereafter to be described. The circuit closer 24 operating through the circuit 26 energizes the solenoid 23 at fixed unit periods of time to thrust the rod 20 through the sleeve 19 and up through the pocket with which the sleeve 19 may be in register. The position which the movable plate and the sleeve 19 and rod 20 occupy is controlled by the position of a marker engaged by the finger 18.

The plate 14 has an extending bracket 28 which bears the finger 18, and which extends up over the top plate 10 to support the adjacent end of a return tube 29 having a vertical leg 30 in register with the push rod 20, and an inclined radial portion 31 which leads from the vertical portion 30 to a central vertical portion 32 where the return tube 29 is pivoted concentrically with the receiving end of the fixed return tube 33. The tube 29 rotates or oscillates back and forth with the plate 14, whereas the tube 33 is stationary. The upper end of the tube 33 has a vertical portion in register with the vertical portion of the tube 29, so that a marker pushed up by the rod 20 will invariably find its way back through the tube 29 to the tube 33 and from thence drop into one of the pockets 13 in register with said lower end 35 of the tube 33.

The lower end 35 of the tube 33 is fixed in a cover plate 36 which extends angularly a sufficient distance to cover a number of holes or pockets equal in amount to the unit periods of time comprising the fixed period over which the demand measurement is to be made. Assuming, for example, that the present meter is to measure the demand from minute to minute of the past thirty minutes preceding, this shield or plate 36 would cover thirty such pockets 13 and thirty markers or balls 15 would be provided for the device. This shield 36 provides the dual function of guiding the balls into their places and retaining them there during normal operation, and it also serves as a housing means for all of the markers when the device is shipped or moved.

While I disclose thirty markers for measurement over a half hour period, it is to be understood that this is explanatory and not limiting. For a half hour period more than thirty balls or markers may be employed, but to keep account of thirty minutes separately, thirty at least are required.

In the present form of the device the forward end of this shield or plate 36 which corresponds to thirty pockets in advance of tube 33 serves as a zero reckoning position from which to measure units of demand at any particular time.

The plate 36 is fixed to the upper end of the post or standard 16, which post or standard in turn is supported upon a base plate or other suitable frame member 37.

The position of the feeling or finding finger 18 is suitably indicated by indicating mechanism 4, which comprises a movable pointer and pen 40 moving over an indicating chart 41, which may at the same time be a graphic recording chart, said chart being advanced by suitable time controlled mechanism as by the clock 25 to record the variations of demand. The pointer 40 is moved across the face of the chart 41 as by means of a collar 42 having threads co-operating with the coarse threads 43 on the spindle 44, which spindle is driven through suitable driving connection in unison with the finding finger 18. The connections which I have shown comprise the pinion 45, mounted on the shaft 44, and the large gear 46 which may be formed integral with the plate 14 by cutting suitable gear teeth upon the periphery thereof. Thus, the varying angular position of the finding finger 18 is transmitted to the pointer 40 through the gear and pinion connection just described.

I preferably provide a damping disc 47 playing between the poles of a fixed drag magnet 48 for damping the movement of the finding finger and its connected indicating mechanism. As will be described later, the finding finger is pushed forward, that is, in a clockwise direction, by the advance of the carrier disc 1, carrying an indicating marker beyond the reckoning zero position. This movement in a clockwise direction is opposed by the spring 17 and when the push rod 20 pushes the marker out of the pocket, the plate 14 and its connected parts is swung in a counterclockwise direction to engage the next marker wherever it may be. Violent motion of these parts is opposed by the drag magnet 48 which causes eddy current in the metal disc 47, as is well understood by those skilled in the meter art.

The advance of the carrying disc 1 is under the control of two mechanisms, first the clock 25 or other suitable time controlled mechanism, and next by a device responsive to the phenomenon under consideration, in this instance illustrated as a gas meter 50. While I have shown a gas meter and have hence applied the meter shown in the present embodiment to measuring the demand for gas, it is to be understood that the meter 50 might equally well be a watt hour meter or any meter whatsoever or device which would measure off equal units of demand or action.

Figure 2A:
Fig. 2A is a fragmentary cross sectional view of a low voltage indicator or low pressure indicator.
Figure 2:
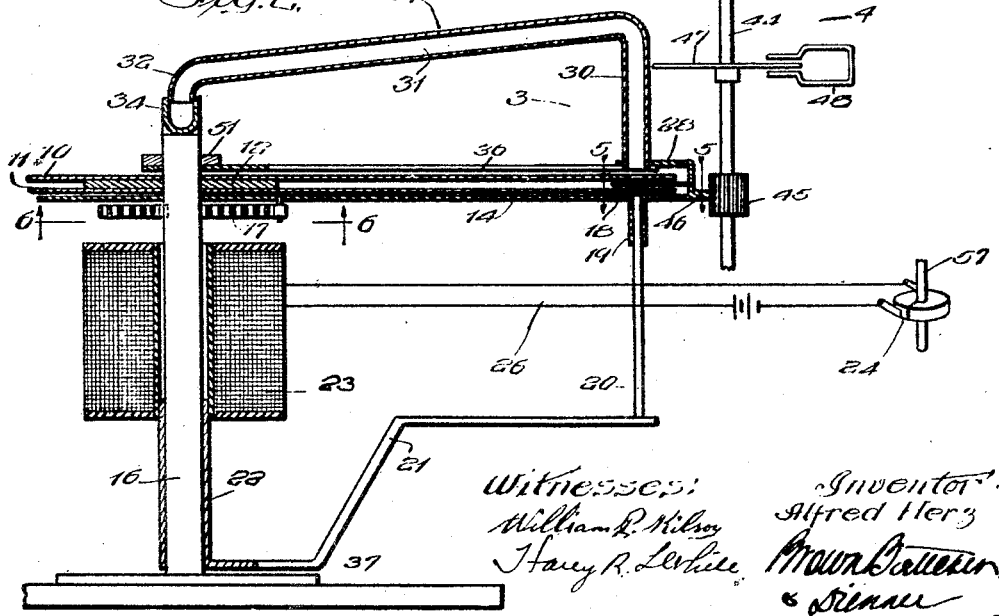
Fig. 2 is an enlarged sectional view taken on the line 2—2 of Fig. 1.

A swinging lever 51 is pivoted at its inner end co-axially with the disc 1 on the standard 16, as may be seen in Figs. 2 and 3. At its outer end the arm 51 is connected to a return spring 52 which tends to return the arm 51 to its extreme left hand or counterclockwise position. A differential bar 53 is pivoted at 54 to the outer end of the lever 51, and one end, namely, the outer end of said differential bar 53 is connected by a pull cable 55 to a swinging crank arm 56 mounted upon the minute shaft 57 of the clock 25.

The pull cable 55 has a stop or button 58 thereon adapted to engage a stationary guide and stop member 59, although this is not essential. The lower arm of the differential lever 53 is connected by similar cable 60 to a crank arm 61 mounted upon a suitable shaft 62 of the meter 50, this crank arm 61 being suitably rotated under the influence of the measuring means in the meter 50. Likewise, the cable 60 has a button 63 adapted to engage a stationary stop and guide member 64. The mechanism just described comprises differential mechanism for adding together two movements for advancing the disc 1. The disc 1 has a series of ratchet teeth 66 cut upon the edge of one of the plates, for example, plate 10, these ratchet teeth being in number and in position to correspond with the pockets 13 in disc 1. A stationary holding pawl 67 prevents retrograde movement of the disc 1 so that its direction of motion is always the same. The disc 1 always moves in a clockwise direction as viewed in Fig. 1.

The arm 51 carries an advancing pawl 68 and the arm 51 with its differential lever 53 is so arranged as to advance the disc 1 one step for each rotation of the shaft 57 and one step for each rotation of the shaft 62 of the meter 50, whether said rotations are simultaneous or not. In practice, the movement of the shaft 62 is relatively rapid with respect to the movement of the shaft 57, so that there will not arise a situation where the recession of the pull wire 55 occurs at the same instant that the advance of the pull wire 60 occurs which would defeat the purpose of the differential mechanism, namely, to obliterate one count arising either from the clock 25 or the meter 50.

While I have shown the differential lever 53 as a preferred method of accomplishing this result, it is to be understood that any other suitable mechanism which will secure the addition without loss of the impulses arising from the clock 25 and the meter 50 will be equivalent in this connection.

In connection with the operation of the push rod or plunger 20, it is to be understood that where electric current is not conveniently available, the push rod 20 may be actuated directly by the clock 25, as for example, at minute intervals.

Where the meter of my invention is employed in connection with electric current, I provide a suitable no voltage indicator, as shown in Fig. 2A, this indicator being mounted over the chart 41 as shown in the upper right hand corner of Fig. 2, and so arranged as to drop a marker or stylus 71 upon the moving chart 41 when no voltage is impressed upon the power circuit. The stylus 71 is attached to the lower end of a solenoid plunger 72 and so long as voltage is impressed upon the power circuit the winding 73 of said solenoid holds the plunger 72 in elevated position, keeping the stylus 71 out of contact with the chart 41. Where the meter of my invention is applied to a gas meter, such stylus 71 may be controlled by a pressure actuated diaphragm for indicating when the gas pressure drops below the certain value, or for giving other suitable indication. The purpose of this no voltage or no pressure indicator is primarily to indicate the inoperativeness of the supply system over a given period of time, so that the chart will automatically indicate by its own record this condition. Such no voltage indicator is shown and explained in connection with my aforesaid co-pending application.

I shall now describe more in detail the theory of operation and the progressive action of operation of my meter.

There are two fundamental ideas involved in this meter. First, the idea of advancing the disc or carrier 1 in accordance with demand and marking off the demand for unit periods of time as, for example, a minute, by placing a marker in a corresponding one of the pockets 13.

The indicating finger 18 is pushed forward a variable distance depending upon the variable amount of demand over a predetermined period of measurement, for example, thirty minutes.

Now, the second fundamental idea is to maintain invariably thirty markers—in case the fixed period of measurement is a thirty minute period—between the finding finger 18 and the actual zero or feeding point which is under the stationary tube 33.

Now it is to be borne in mind that in the position shown in Fig. 1 the tube 33, which is stationary, indicates the actual zero or feeding position for the markers, whereas the movable finger 18 and its return tube 29 occupies the reckoning zero position, and that movement of the finding finger 18 and connected parts in a clockwise direction occurs in response to accrued demand within the period of measurement, namely, the elapsed preceding thirty minute period.

Assume that the parts are in position shown in Fig. 1 and that the meter 50 is not in operation, whereas the clock mechanism 25 is always maintained in operation in order to be ready when demand as measured by the meter 50 begins. As the minute shaft 57 rotates the differential lever 53 will be given a pull to the right against the tension of the spring 52. The proportioning of the parts is such that such pull on the cable 55 will result in the rocking of the arm 51 sufficiently far forward to the right to advance the disc 1 by one notch or through one pocket. That is to say, the disc is moved under the tube 33 by the distance of one pocket 13. At the same time that the disc is advanced and at the end of the minute period, as indicated by the minute shaft 57, the discharge rod 20 will be thrust upward as by energization of the solenoid 23, pushing the ball or marker which may be lying in the pocket in register with the push rod 20. This ball is pushed up to the top of the vertical portion 30 of return tube 39 from whence it returns by gravity to the feeding tube 33 and drops into the next registering pocket 13 under the end of said tube 33.

So long as no demand as measured by the meter 50 occurs, the disc 1 will be stepped forward one step per minute, or other unit period of time, and simultaneously a ball will be punched out of the most advanced position and returned to the zero position or feeding position by the tube 33, so that the indicator 40 remains substantially at zero position. The operation of the advance and discharge of the ball may be made substantially simultaneous so that the small movements from zero position will be inappreciable. Also, if desired, the shaft 44 may be cut into two sections having inter-engaging shoulders or stops held together by a spring so arranged that the relatively quick advance and immediate release will not be transmitted to the indicator 40, but the same will remain at zero position so long as no demand accrues. The position of the thirty markers or steel balls may be compared to a series of balls in the hands of a juggler maintained in the air in a fixed path which corresponds to the path through which the markers are circulated when no demand accrues.

Attention is called to the fact that the arc of the circle in which the zero movement occurs is of fixed length, even though the disc 1 moves continuously. Attention is also called to the fact that the return path of the marker from most advanced position to zero or feeding position is of constant length, because it is equal to the two radii of the circle defined by the series of pockets about the periphery of the disc 1.

Assume now that the meter 50 begins to operate with the result that the rotations of the shaft 62 swing the differential lever 53 about its upper end as a pivot, and advances the swinging arm 51 forward in a clockwise direction one step for each rotation of said shaft 62.

As soon as this occurs there is added to the circulating movement previously described, and which is constant, the variable advance due to accrued units of demand within the thirty minute period past preceding.

Assume that within the first minute within which demand accrues, the shaft 62 rotates three times, then it will be apparent that the finding finger 18 will be pushed forward three steps in advance of the zero reckoning position in a clockwise direction, as viewed in Fig. 1. This motion will be transmitted to the pointer 40 and recorded on the chart 41.

I have combined the function of applying a marker at the end of a minute period and the removal of another marker at the end of the same minute period from the other end of the series all in one operation. That is to say, the push rod 20 when it removes a marker from the foremost position at the end of a minute automatically moves this same marker back to the actual zero or feeding position, the small period of time required for the ball to travel from the advanced pocket to the zero pocket being inconsequential since it is a constant.

Thus when the meter 50 begins to operate it will be observed that the pockets immediately adjacent the finding finger 18 will all be full and that the beginning of demand advances all of the series in solid formation forward in a clockwise direction, and it is only thirty minutes later when the gap corresponding to the demand registered by the meter 50 advances to the finding finger 18 and is there obliterated by removal of the marker 15 in front of such gap.

It will be observed, therefore, that there are always between actual zero position and the foremost position of the finding finger 18 a number of markers corresponding to the number of unit periods of time in the reckoning period. That is to say, in the meter herein shown, there are always thirty markers between the actual zero or feeding position and the position of the finger 18 excepting, of course, the brief period of time in which a marker is being returned from foremost position in the series to zero position in the series.

It will be apparent from the above that by a surprisingly small amount of mechanism I am able to measure accurately a highly complicated and involved measurement. In brief, my device always interposes the complete number of markers corresponding to units of time in the period of measurement, between zero or feeding position and the position of the indicator. When no demand occurs, these markers are circulated idly. Instead of circulation of the same markers, obviously one marker might be thrown away or destroyed and a new one put in the zero position without departing from the spirit of the invention, the essential idea being to maintain a record of the separate unit periods of time and the amount of advance corresponding to demand for each unit period of time. Where the demand over any one or more of such unit periods is zero, obviously no advance of the finding finger 18 should occur and that is the fact in the present meter because these markers are successively brought forward and tested by the finger 18 to ascertain what their indication may be. It may seem at first like adding minutes and kilowatts to have the movement of the disc 1 controlled indiscriminately by minutes or kilowatts and advance a step for each indiscriminately. Such addition, however, is permissible since in the final result minutes are subtracted as fast as they are added, whereas the number of kilowatts accrued during a particular minute are not subtracted until that particular minute is thirty minutes past.

It will be apparent to those skilled in the art that my invention is not to be limited to the details of construction which I disclosed in the preferred embodiment, but that the same may be widely varied, as the theory and mode of operation of this meter is, I believe radically new.

I claim:

1. The method of indicating demand over a fixed period of time which comprises moving a series of markers of fixed number corresponding to the units of time in the fixed period of time from a zero position along a predetermined path, separating said markers by distances along the path corresponding to the demands for successive units of time, and measuring the advance from zero of the foremost marker in terms of demand.

2. In combination, a series of markers, a carrier for carrying said markers, said carrier having uniformly spaced recesses for receiving said markers, means for returning said markers one at a time from an advanced position to a predetermined feeding position, means for advancing said carrier simultaneously with the return of a marker to zero position, means for advancing the carrier in steps corresponding to units of demand to carry the foremost marker to a variable advanced position to correspond to the total demand for a predetermined period of time, and indicating means for indicating the said demand.

3. In combination, a movable element, means for advancing said element in steps corresponding to units of demand as they accrue, means for advancing said element one step for each unit of time elapsed, and means for indicating on said element the distance said element has moved during successive unit periods of time.

4. In combination, a series of markers corresponding to unit periods of time, means for stepping said markers through a path, one step per unit of time, means for lengthening said path a step per unit of demand, and means for proportionally indicating the variations in the length of said path.

5. In combination, a fixed series of markers corresponding to units of time, spaced unit steps apart, means for returning the foremost marker to zero position upon the completion of each successive unit of time, and means for advancing all of the remaining markers ahead of said returned marker a distance in steps corresponding to units of demand accrued during a unit period of time.

6. In combination, a fixed series of markers corresponding to units of time, spaced unit steps apart, means for moving all of said markers forward one step at a time and returning the foremost marker to zero position upon the completion of each successive unit of time, and means for advancing all of the remaining markers ahead of said returned marker a distance in steps corresponding to units of demand accrued during a unit period of time.

7. In combination, a fixed series of markers corresponding to the units of time in a predetermined period, spaced unit steps apart in the arc of a circle, means for returning the foremost marker to zero position upon the completion of each unit of time, and means for substantially simultaneously advancing the other markers a step forward to maintain the foremost marker in an advanced position.

8. In combination, a fixed series of markers corresponding to the units of time in a predetermined period, spaced unit steps apart in the arc of a circle, means for returning the foremost marker to zero position upon the completion of each unit of time, and means for substantially simultaneously advancing the other markers a step forward to maintain the foremost marker in an advanced position, and means for advancing all of the markers in steps corresponding to units of accrued demand.

9. In combination, a fixed series of markers corresponding to the units of time in a predetermined period spaced apart in the arc of a circle, means for advancing all of the markers a step at a time corresponding to accrued units of demand, and means for returning the foremost marker to zero feeding position upon the completion of a unit period of time.

10. In combination, a fixed series of markers corresponding to the units of time in a predetermined period spaced apart in the arc of a circle, means for advancing all of the markers a step at a time corresponding to accrued units of demand, and means for returning the foremost marker to zero feeding position upon the completion of a unit period of time, and means for proportionally indicating variation in the length of the path of movement by said marker.

11. In combination, a fixed series of markers corresponding to the units of time in a predetermined period spaced unit steps apart, means for advancing all of the markers by unit steps corresponding to units of demand accrued means for returning the foremost marker to zero position in the series upon the completion of a unit of time.

12. In combination, a fixed series of markers corresponding to the units of time in a predetermined period spaced unit steps apart in the arc of a circle, means for advancing all of the markers by unit steps corresponding to units of demand accrued, means for returning the foremost marker to zero position in the series through a path of substantially constant length upon the completion of a unit of time, and means for advancing the series by one step simultaneously with the return of the foremost marker.

13. In combination, a series of markers corresponding to units of time in a predetermined period spaced apart unit steps and disposed in a path of a predetermined length, means for removing the foremost marker from the front of the series moving the remainder of the series forward by one step and returning the removed marker back to the foot of the series into zero position, said means being so actuated at the completion of each unit of time, and means for independently advancing the markers of the series by unit steps in accordance with units of accrued demand in an extension of said path to bring the foremost marker beyond the previous foremost position thereof.

14. In combination, a series of markers corresponding to units of time in a predetermined period spaced apart unit steps and disposed in a path of a predetermined length, means for removing the foremost marker from the front of the series moving the remainder of the series forward by one step and returning the removed marker back to the foot of the series into zero position, said means being so actuated at the completion of each unit of time, means for independently advancing the markers of the series by unit steps in accordance with units of accrued demand in an extension of said path to bring the foremost marker beyond the previous foremost position thereof, and means for proportionally indicating the variation in the foremost position of successive foremost markers.

15. In a meter of the class described, a moving element advanced in accordance with demand, and time controlled means for placing markers upon said element and for advancing it upon the completion of unit periods of demand.

16. In a meter of the class described, a moving element advanced in accordance with demand, and time controlled means for placing markers upon said element and for advancing it upon the completion of unit periods of demand, and means for measuring the demand for a predetermined period of time by measuring the advance of the marker corresponding to the beginning of said period.

17. In combination, a rotatable disc having a series of pockets therein, means for advancing said disc a pocket at a time, time controlled means for operating said advancing means at unit periods of time demand controlled means for operating said advancing means a pocket per unit of demand, a series of markers for said pockets, a finding finger for engaging the foremost one of the series in said pockets, means for removing the foremost one of the series of markers and for placing a marker in a pocket at the foot of the series upon the completion of each unit period of time.

18. In combination, a movable carrier, a series of markers for the carrier, means for placing a number of markers upon said carrier corresponding to the number of units of time in a fixed period of measurement, time controlled means for removing the foremost marker of the series and for applying a marker at the foot of the series at the completion of each unit of time, a meter, and means under the control of the meter for separating each said last marker of the series from its predecessor in the series by angular distances corresponding to accrued demand for the various unit periods of time represented by adjacent markers, and indicating means responsive to the position of the foremost marker.

19. In combination, a vertical standard, a disc rotatably mounted on the standard, said disc having a series of pockets, a fixed feeding tube, a rotatable return tube, means in register with the return tube for removing a marker from a pocket and returning the same to the feeding tube, a feeling finger controlling the position of said return tube and removing means, and indicating means responsive to the position of said feeling finger.

20. In combination, a rotatable disc having a series of pockets disposed about the periphery of the same, means for advancing said disc, a feeding tube for feeding markers into the pockets at zero position, removing means for removing each marker after the same has been in position on the disc a fixed period of time, means for moving the disc in accordance with a variable action under consideration, and indicating means responsive to the position of said removing means.

21. In combination, a vertical shaft, a rotatable disc mounted on said shaft, said disc having a series of pockets about its periphery, pawl and ratchet mechanism for advancing the disc a pocket at a time, a fixed feeding tube for feeding markers into the pockets, a finger for engaging the foremost marker, spring means for said finger, removing means for removing a marker from the disc after it has been in a pocket for a fixed period of time, and indicating means responsive to the position of said finger.

22. In combination, a rotatable disc having pockets therein, a series of markers for said pockets, a radially extending feeding tube having a fixed position, advancing means for advancing the disc a pocket at a time, a radially extending return tube movable with respect to the disc, said return tube being connected to the feeding tube, and marker removing means carried with said return tube for discharging a marker from a pocket on the disc and returning the same through said feeding tube.

23. In combination, a rotatable disc, means for advancing said disc in fixed steps, means for applying markers to said disc in register with said fixed steps, angularly movable means movable with respect to the disc, said angularly movable means being controlled by the position of the foremost markers, indicating means actuated by said angularly movable means, and damping means for damping the motion of said indicating means.

24. In combination, a movable element, means for advancing said element in steps corresponding to units of demand as they accrue, means for marking on said element unit periods of time, and means for recording the position of each marker at the end of a predetermined period of time.

In witness whereof, I hereunto subscribe my name this 19th day of August, 1925.

ALFRED HERZ.